(12) United States Patent (10) Patent No.: US 6,171,186 B1
Kurosawa et al. (45) Date of Patent: Jan. 9, 2001

(54) GAME PROCESSING METHOD, GAME DEVICE, IMAGE PROCESSING DEVICE, IMAGE PROCESSING METHOD, AND RECORDING MEDIUM

(75) Inventors: Masahito Kurosawa; Kenji Sasaki, both of Tokyo (JP)

(73) Assignee: Kabushiki Kaisha Sega Enterprises, Tokyo (JP)

( * ) Notice: Under 35 U.S.C. 154(b), the term of this patent shall be extended for 0 days.

(21) Appl. No.: 08/900,317

(22) Filed: Jul. 25, 1997

(30) Foreign Application Priority Data

Jul. 25, 1996 (JP) .................................................. 8-195833
May 7, 1997 (JP) .................................................. 9-116681

(51) Int. Cl.[7] .................................................. A63F 9/22
(52) U.S. Cl. .................................. 463/31; 463/6; 463/23; 434/69; 434/62; 434/64
(58) Field of Search .................................. 463/6, 30, 31, 463/33, 34, 23, 25; 434/62–65, 69, 71

(56) References Cited

U.S. PATENT DOCUMENTS

| | | | |
|---|---|---|---|
| 4,383,827 | * 5/1983 | Foerst | 434/71 |
| 5,269,687 | * 12/1993 | Mott et al. | 434/65 |
| 5,299,810 | * 4/1994 | Pierce et al. | 463/30 |
| 5,354,202 | * 10/1994 | Moncrief et al. | 434/65 |
| 5,366,376 | * 11/1994 | Copperman et al. | 434/65 |
| 5,577,960 | * 11/1996 | Sassaki | 463/31 |
| 5,618,179 | * 4/1997 | Copperman et al. | 434/65 |
| 5,755,620 | * 5/1998 | Yamamoto et al. | 463/34 |
| 5,816,913 | * 10/1998 | Nakamura | 463/6 |
| 5,910,046 | * 6/1999 | Wada et al. | 434/65 |

* cited by examiner

Primary Examiner—Valencia Martin-Wallace
Assistant Examiner—John M Hotaling, II
(74) Attorney, Agent, or Firm—Lackenbach Siegel Marzullo Aronson & Greenspan, P.C.

(57) ABSTRACT

In a race game comprising a preliminary round and a main race, a player can start the game without waiting for other players, the boredom of waiting time is eliminated, and skillful players can be satisfied with the game. An image processing device for generating game images, and a plurality of game units each provided respectively with communications control devices connected to this image processing device, which control communications with other devices, are provided, and the communications control devices are connected to each other. When any of the players inserts a coin, the corresponding communications control device immediately starts a preliminary round, and when this preliminary round is completed, it displays a demonstration screen during the waiting period before the start of the main race. In the main race, it determines the start position of the player according to the results from the preliminary round, suspends the game for any player who runs out of time, and when a main race is finished, it displays a demonstration screen until the start of the next main race.

17 Claims, 11 Drawing Sheets

GAME PROCESSING METHOD, GAME DEVICE, IMAGE PROCESSING DEVICE, IMAGE PROCESSING METHOD, AND RECORDING MEDIUM

BACKGROUND OF THE INVENTION

1. Field of the Invention

This invention relates to a game processing method, game device, image processing device, image processing method and recording medium, and more particularly, to game processing whereby objects, such as cars, or the like, are moved about on a monitor in response to operations by players, as in a driving (car race) game.

2. Description of the Related Art

With the progress of computer graphics technology in recent years, image processing devices providing a variety of images have been proposed. Some of these are used in so-called video game devices, and provide race games, shooting games, simulation games, action games, or the like.

In game devices of these kinds, whether they be for domestic or commercial use, devices capable of displaying clearer and more realistic images are in demand. Game devices are generally provided with: a game main unit containing an inbuilt computer device for implementing pre-recorded game programs, operating devices for supplying the computer device with operating signals instructing objects represented in the game to move, a display for displaying images relating to the development of the game in accordance with the game program implemented by the computer device, and a sound device for generating sounds relating to the development of the game.

In recent years, in order to create impressive screen images of even higher quality, video images created by defining image data in a virtual three-dimensional coordinate space, positioning objects (characters), a background, and the like, in this space, and viewing this from a prescribed viewpoint, have come to be displayed in video game devices.

(Prior Art Example 1)

One type of a game device constituted in this way is a device for playing driving games (car race games). In this type of game device, it is possible to play a rally-type game where a plurality of players take part and compete for position.

(Prior Art Example 2)

Furthermore, in driving games, it is sought to create as realistic as possible a simulation of car movements, and this point is important to the players' enjoyment of the game.

Conventionally, simulations of this kind use a single-point model in place of the car at one material point, such as the car's center of gravity. The state of contact (also called impact or collision) between the car (tires) and the ground is determined by this one point alone, and a simplified simulation is produced without making any calculation for suspension or the like. Therefore, the game only depicts a monotonous movement of the car under specific conditions, and there is no movement of the car in the pitch, roll or yaw directions, or alternatively, the car is caused to drift when the steering angle is above a certain value.

Simulations based on single-point models of this kind involve simple processing and any car movement desired by the manufacturer can easily be reproduced, but there remains an unnatural feeling about the simulated movement of the car, meaning that the game lacks realism and the game device has a low added value.

Therefore, rather than taking the car as a single material point, game machines have been devised which are capable of implementing more complete simulations in real time, wherein the four tires are in contact with the road surface and each tire respectively receives a force from the road surface, these forces act upon the car through the suspension, and the movement of the car is determined accordingly.

(Problem 1)

As described previously, in a conventional communicative race game where a plurality of people can play, when one person inserts a coin, the message "Waiting for player" is displayed on the other screen, and that person waits while other users of the game device get ready. During this time, the first player cannot do anything (or even if he or she can, it will merely be something like selecting the course,) and he or she must wait until a count-down is completed. Furthermore, since in most games the course selection is based on a majority decision, it is often the case that players are not able to use the course they want when skilled players are mixed with beginners.

Furthermore, once the game has started, the race leader (the person in first position) is able to extend the race. If the race leader passes through a check point within a prescribed period of time, then even if the other players have not reached the check point, for example, all of them will have their game time extended. Whilst this is advantageous in that all the players can enjoy the game to the very end, from the viewpoint of competitive racing where the aim is to beat the other players, it leaves a feeling of dissatisfaction. Moreover, as regards the conditions for the end of the game, the game is stopped compulsorily when the race leader's time reaches zero, or when the race leader reaches the end.

Furthermore, conventionally, in order to ensure competition between skilled players and novices on the race screen, compensating factors are applied (for example, the cars of lower placed players are speeded up, or the timing of restarts after crashing is changed). However, skilled players may be unhappy with this, since from their point of view they are unable to create a distinction which corresponds to their skill level, and many people have complained that in the end driving becomes difficult and they get no satisfaction even if they do win, because even novices can drive fast.

(Problem 2)

If it is seriously sought to simulate the movements of an object in a car race game, then it is necessary for movement to be applied to the car in directions other than the one selected by the steering wheel or the direction in which the car is facing, according to the standard laws of dynamics. For example, in creating a proper simulation it is desirable to apply movements such as spinning, tail slides and four-wheel drift to the car.

In this case, when simulating the movement of the whole car, it may be seen as desirable to compute the forces and the like applied to each of the four wheels of the vehicle, as in an actual car, but this inevitably increases the computing load on the CPU and if this computing process is conducted properly, then other image processing will not be carried out adequately. Of course, it is also possible to eliminate problems of this kind by using a CPU with increased computing power, but in this case, not only are manufacturing costs raised, but the time required for computer processing also increases. In addition, there is the problem of the work required to create a program for calculating the forces and the like applied to each of the four car wheels.

In an image processing device, particularly a game device, which is required to respond swiftly to operations by the player or operator, it is inconvenient if a long time is required for calculation, and ultimately, this will detract from the appeal and interest of the game device for the player or operator.

Furthermore, conventionally, in game devices of this kind, consideration has not been given to conducting this image processing rapidly and reliably after it is judged that there has been a collision between two cars, which are the objects of the game.

SUMMARY OF THE INVENTION

In order to resolve problems of this kind, it is an object of the present invention to provide an image processing device and game device whereby a game can be played by a plurality of players without the players being caused to wait. It is a further object thereof to provide an image processing device and game device whereby each player can play the game independently of the race leader. It is a further object thereof to provide an image processing device and game device whereby both a novice and a skilled player can take part in a race according to their own skill level.

This invention provides an image processing device which allows the movement of objects, such as cars, or the like, to be displayed by a more realistic simulation without increasing the computing load on the processing device. It also provides an image processing device wherein models for reliably controlling the movements of the objects can be used. It also provides an image processing device which is capable of determining collisions between two cars and conducting appropriate image processing swiftly and reliably. Moreover, by achieving these objects, this invention also provides a game device which creates excellent appeal and interest.

The processing method for a game relating to this invention comprises a preliminary game implementation step for implementing a preliminary game, followed by a main game implementation step for implementing a main game, and in a game processing method for conducting a contest between a plurality of players, the preliminary game implementation step comprises a preliminary game starting step for implementing a preliminary game according to the operations of each of the players, and a first time period adjustment step for displaying a prescribed image after any of the players has finished the preliminary game until the start of the main game.

The processing method relating to this invention comprises a preliminary game implementation step for implementing a preliminary game, followed by a main game implementation step for implementing a main game, and in a game processing method for conducting a contest between a plurality of players, the main game implementation step comprises a main game position locating step for determining the start positions of the plurality of players based on the results of the preliminary game implementation step, a monitoring step for monitoring the time status of the players, a notification step for suspending the game for players who have run out of time and indicating this information to other players, and a second time adjustment step for displaying a prescribed image after the main game has finished until the start of the next main game.

The game device relating to this invention comprises: an image processing device for generating game images; a plurality of game units each provided respectively with communications control devices connected to the image processing device, which control communications with other devices; and connecting means for connecting the communications control devices in this plurality of game units. The communications control devices implement all of the processing described above.

The game device relating to this invention comprises: an image processing device for generating game screens; a plurality of game units each provided respectively with communications devices connected to the image processing device, which conduct communications with other devices; a control device for controlling this plurality of game units; and connecting means for connecting the communications devices in the plurality of game units with the control device. The control device implements all of the processing described above.

The recording medium relating to this invention is a recording medium whereon programs for implementing the following steps in a processing device are stored. (a) A preliminary game starting step for implementing a preliminary game in accordance with an operation by any of the players; (b) a first time adjustment step for displaying a prescribed image after any of the players has finished the preliminary game until the main game starts; and (c) a main game implementation step for implementing a main game following the preliminary game implementation step comprising steps (a) and (b) above.

Examples of such a recording medium include: a floppy disk, magnetic tape, optomagnetic disk, CD-ROM, DVD, ROM cartridge, RAM memory cartridge with battery backup, flash memory cartridge, fixed RAM cartridge, and the like. A recording medium stores information (mainly digital data and programs) by physical means of some kind, and it can cause a processing device such as a special processor, or the like, to perform prescribed functions.

In an image processing device which decides the mutual relationships between a plurality of objects composed in a virtual space and generates display images of these objects based on the results of these decisions, the image processing device relating to the present invention comprises: positioning means for creating a coordinates system based on any of the plurality of objects and positioning the other objects within this coordinates system; judging means for determining the paths of travel of the other objects and making judgments based on the impingement relationship between the object created the coordinates system and these paths of travel; calculating means for calculating the forces acting between objects based on their paths of travel, for objects which are adjudged from the object impingement relationship to have made contact or collided; and image generating means for applying movement to the objects based on these calculation results and generating an image of the corresponding situation.

The objects may be, for example, cars, planes, ships, characters, or the like, composed of so-called 'polygons'. Images are provided by projecting the objects onto a flat screen by a commonly known image processing method. When there is relative movement between a plurality of objects at predetermined coordinates (perpendicular coordinates, polar coordinates, or the like), appropriate movement (movement based on actual physical laws, such as laws of preservation of momentum, for example, or movement unrelated to this) is applied to the plurality of objects in the virtual space on the basis of the relationship existing therebetween, for example, if there is contact or a collision therebetween. The realism and interest of the game, for example, is considered when this movement is selected.

In an image processing method which decides the mutual relationships between a plurality of objects composed in a virtual space and generates display images of these objects based on the results of these decisions, the image processing method relating to this invention comprises: a first step for creating a coordinates system based on any of the plurality of objects; a second step for locating the other objects within this coordinates system; a third step for determining the path of travel of the objects; a fourth step for making judgments based on the impingement relationship between the object created the coordinates system and these paths of travel; a fifth step for calculating the forces acting between objects based on their paths of travel, for objects which are adjudged from the impingement relationship in the fourth step to have made contact or collided; a sixth step for applying movement to the objects based on these calculation results; and a seventh step for generating an image of the corresponding situation.

The recording medium relating to this invention is a recording medium which stores programs for implementing the following steps in a processing device. (a) A first step for creating a coordinates system based on any of the plurality of objects; (b) a second step for locating the other objects within this coordinates system; (c) a third step for determining the paths of travel of the objects; (d) a fourth step for making judgments based on the object impingement relationship formed by the paths of travel and the coordinates system; (e) a fifth step for calculating the forces acting between objects based on their paths of travel, for objects which are adjudged from the impingement relationship in the fourth step to have made contact or collided; (f) a sixth step for applying movement to the objects based on these calculation results; and (g) a seventh step for generating an image of the corresponding situation.

Examples of such a recording medium include: a floppy disk, magnetic tape, optomagnetic disk, CD-ROM, DVD, ROM cartridge, RAM memory cartridge with battery back-up, flash memory cartridge, fixed RAM cartridge, and the like. A recording medium stores information (mainly digital data and programs) by physical means of some kind, and it can cause a processing device such as a special processor, or the like, to perform prescribed functions.

DESCRIPTION OF THE PREFERRED EMBODIMENTS

Below, a first mode of implementing the present invention is described with reference to the drawings.

Figure 1:
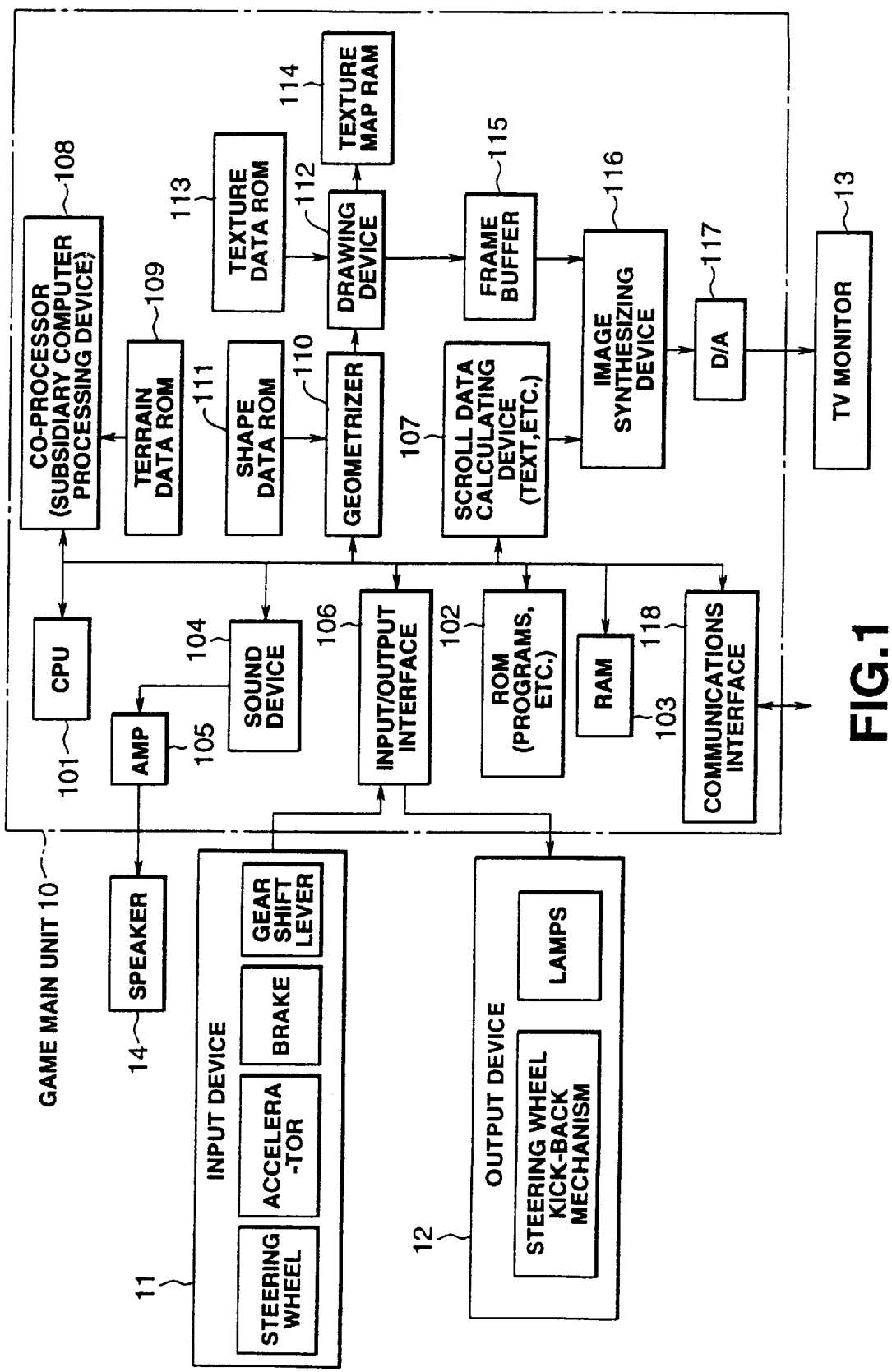
FIG. 1 is a functional block diagram of a game device relating to a first mode of implementing this invention.

FIG. 1 is a block diagram of a mode for implementing the image processing device relating to the present invention and a game device using same. The essential components of this game device are a game main unit 10, input device 11, output device 12, TV monitor 13, and speakers 14.

The input device 11 comprises a steering wheel, accelerator, brake, gear shift lever, view changer switch, and the like, and the output device 12 is provided with a steering wheel 'kick-back' mechanism, and various lamps, and the like. The steering wheel 'kick-back' mechanism applies a prescribed reaction force to the steering wheel in accordance with the movement of the car, as described later.

The TV monitor 13 displays the images of the driving game and a projector may be used in place of this TV monitor. The view changer switch alters the viewpoint. By operating this switch, the player can, for example, be provided with a viewpoint from the driving seat, or a viewpoint which observes his/her own car obliquely from the rear.

In addition to a CPU (central processing unit) 101, the game main unit 10 comprises: a ROM 102, RAM 103, sound device 104, input/output interface 106, scroll data calculating device 107, co-processor (subsidiary calculating device) 108, terrain data ROM 109, geometrizer 110, shape data ROM 111, drawing device 112, texture data ROM 113, texture map RAM 114, frame buffer 115, image synthesizing device 116, and a D/A converter 117.

The CPU 101 is connected via a bus line to the ROM 102 which stores prescribed programs and the like, the RAM 103 which stores data, the sound device 104, input/output interface 106, scroll data calculating device 107, co-processor 108 and geometrizer 110. The RAM 103 functions as a buffer, and writes various commands to the geometrizer 110 (such as object display commands, and the like,) and it writes matrices for conversion matrix calculation.

The input/output interface 106 is connected to the input device 11 and the output device 12, whereby operating signals from the steering wheel and the like in the input device 11 are supplied to the CPU 101 as digital values, whilst at the same time signals generated by the CPU 101 and the like can be output to the output device 12. The sound device 104 is connected to the speaker 14 via a power amplifier 105 and sound signals generated by the sound device 104 are amplified before being fed to the speaker 14.

In the mode for implementing the present invention, the CPU 101 reads in operating signals for the input device 11 based on a program stored in the ROM 102, terrain data from the terrain data ROM 109, and shape data from the shape data ROM 111 (three-dimensional data for "objects, such as own car and rival car", and "background, such as moving road, terrain, sky, spectators and structures", and the like), and it conducts, at the least, a car simulation involving judgment of contact (impact) between the ground and the car, calculation of the movement of the car as a whole, calculation of the body movement (this is similar to movement of the suspension, and is described in detail below), and judgment of collisions between cars, and the like.

The CPU 101 uses a three-dimensional (global) coordinates system known generally as a right-hand coordinates system, to create a virtual space coordinates system wherein the Z direction extends towards the back of the screen, the Y direction, towards the bottom of the screen and the X direction, towards the right of the screen. The CPU reads in shape data for the terrain from the terrain data ROM 109 and shape data for cars and the like from the shape data ROM 111, and processes this data in accordance with input signals, to compose an image wherein a plurality of cars are travelling within the aforementioned coordinates system. These cars comprise the player's own car that he or she is operating, and other cars controlled by the game device (as stated previously, these may be called 'rival cars'.)

In calculating the movement of the car, the car's movement in the virtual space is simulated in accordance with the operating signals given by the player via the input device 11, and after coordinate values in the three-dimensional space have been determined, a conversion matrix for converting these coordinate values to a viewpoint coordinates system, and shape data (cars, terrain, and the like), are designated to the geometrizer 110. The co-processor 108 is connected to a ROM 109 storing data which defines the cars as elliptical models for the purpose of judging collisions, and accordingly this predetermined data is supplied to the co-processor 108 (and CPU 101).

The co-processor 108 principally conducts judgment of impacts between the four wheels of the cars forming the game objects and the ground, judgment of collisions between cars, and, when necessary, judgment of collisions between cars and structures, and during this judgment processing and movement calculation, it mainly undertakes floating-point calculations. Therefore, since the co-processor 108 judges impacts (collisions) relating to the cars and supplies these judgment results to the CPU 101, the calculational load on the CPU is reduced and this judgment of impacts can be conducted more rapidly.

The geometrizer 110 is connected to the shape data ROM 111 and the drawing device 112. The shape data ROM 111 defines the forms and shapes (body coordinates) of characters, such as the player's car and rival cars consisting of a plurality of combined polygons, or of the background, such as the terrain, sky, or the like. (Here, an appropriate number of polygons can be selected.) These shape definitions comprise: a coordinate value list for each apex of the group of polygons used (the coordinate value list consists of three-dimensional data values), a list of polygon surfaces indicating four optional points from the apex list by an apex number, for each polygon surface, and a list indicating reference positions for determining the display order for each polygon, attributes for determining whether only one side or both sides of a polygon are displayed, and polygon attributes, such as elements for attaching two-dimensional pictures (known as "bit map data" or "texture") to the polygons, and the like.

The CPU 101 forms three-dimensional objects for these characters and the like consisting of a plurality of polygons (these are principally four-sided shapes with 4 apexes, or three-sided shapes where two of these apexes coincide,) based on the data from the ROM 111, and it models and converts these to locate them in the three-dimensional coordinates system (global coordinates system). The CPU 101 then carries out viewpoint conversion processing based on the viewpoint, as described above, and also performs three-dimensional clipping.

To perform this processing, the CPU 101 reads out the aforementioned coordinate value list, the polygon surface list and the polygon surface attribute list, and the like, from the ROM 102. It then passes this data to the geometrizer. The geometrizer 110 carries out perspective conversion of the designated data using a conversion matrix supplied by the CPU 101, and it also conducts two-dimensional clipping, to produce data converted from the global coordinates system to a viewpoint coordinates system in the three-dimensional virtual space.

The drawing device 112 applies texture to the converted shape data in the viewpoint coordinates system, and outputs the data to the frame buffer 115. In order to apply this texture, the drawing device 112 is connected to a texture data ROM 113 and a texture map RAM 114, as well as to the frame buffer 115.

The terrain data ROM 109 stores shape data set in relatively broad terms (simple terms) which is sufficient for carrying out judgment of impacts between a car and the ground or judgment of collisions between cars. For example, the shape of the car is defined as rectangular when judging collisions. The shape data ROM 111, on the other hand, stores data which is specified more precisely and relates to the shapes forming the images of cars, background and the like.

The scroll data calculating device 107 calculates data for scrolling screens of text, or the like, and this calculating device 107 and the aforementioned frame buffer 115 are connected via the image synthesizing device 116 and D/A converter 117 to the TV monitor 13. Thereby, the polygon images of the cars, terrain (background) and the like stored temporarily in the frame buffer 115 are synthesized in a designated priority with a scrolling image of text information indicating the speed, lap time, and the like, to generate the final frame image data. This image data is converted to an analogue signal by the D/A converter 117 and supplied to a TV monitor 13, which displays the image of a driving game in real time.

A communications interface 118 conducts data communications between the CPU 101 and the other devices, and comprises, for example, a converter for converting parallel data from the CPU bus to serial data and converting data back the other way, and a controller for establishing communications protocols.

Figure 2:
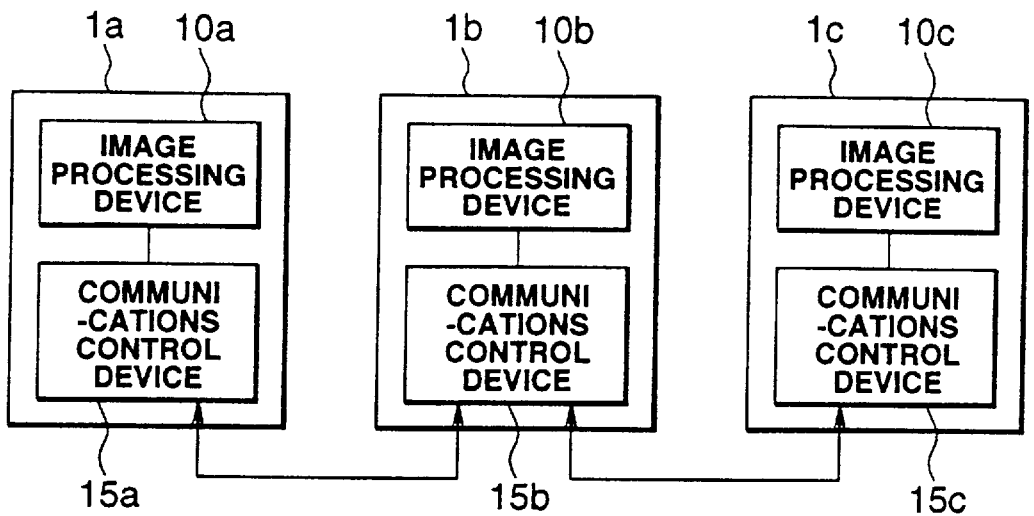
FIG. 2 is a functional block diagram of a communicative game device relating to a first mode of implementing this invention.

FIG. 2 shows the composition of a communicative game device wherein a total of, for example, three of the game devices shown in FIG. 1 are connected together (a different number of devices may be used). The three game devices 1a, 1b, 1c are each provided respectively with image processing devices 10a, 10b, 10c and communications control devices 15a, 15b, 15c. Each communications control device 15 is connected to the communications interface 118 of the image processing device 10, and is provided with a plurality of ports corresponding 1-to-1 with the other devices. In the example shown in FIG. 2, the communications control device 15b is provided with at least two ports. Alternatively, it is also possible to use a single port for connecting to a plurality of other devices (for example, an ethernet). According to this system, each of the game devices 1 is able to gather information (such as points scores, ranking, time, and other status information) from the other game devices.

Figure 3:
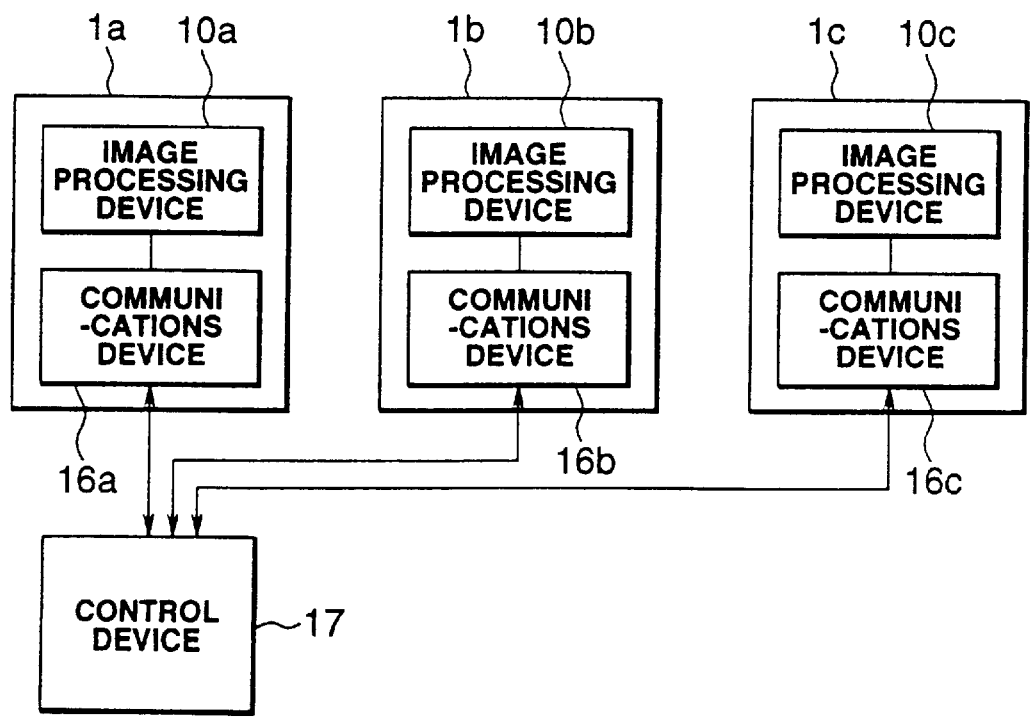
FIG. 3 is a functional block diagram of a further communicative game device relating to a first mode of implementing this invention.

FIG. 3 shows a different composition for a communicative game device. The communications devices 16a, 16b, 16c in the game devices 1a, 1b, 1c are provided with ports for sending the information contained in their respective image processing devices 10a, 10b, 10c to a control device 17, and receiving control information from the control device 17. The control device 17 comprises communications interfaces equal in number to the game devices for gathering information from the game devices. It then transmits this information along with any necessary control information (for example, switching display of other player's cars on and off, or changing rankings) to each of the game devices. In the case shown in FIG. 3, the information for the game devices is collected in one operation by the control device 17, thereby simplifying the structure of the communications devices 16 in the games devices 1.

Figure 4:
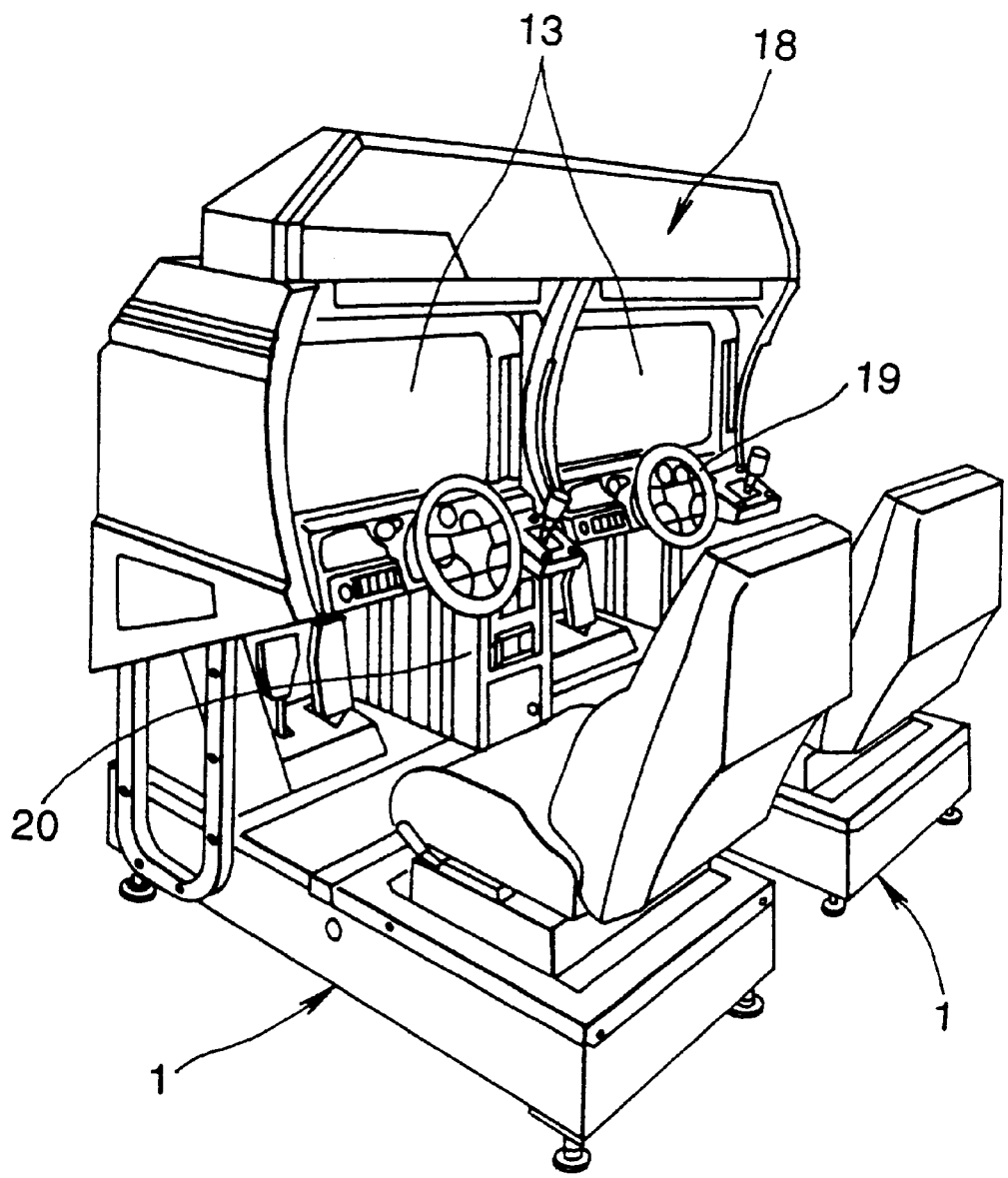
FIG. 4 is an external view of a communicative game device relating to a first mode of implementing this invention.

FIG. 4 is an oblique view of a communicative game device as shown in either FIG. 2 or FIG. 3. This diagram shows a system comprising two game devices, although as stated previously, any number of game devices may be incorporated. The game devices 1 are each formed in the shape of a car cockpit, and are provided respectively with a TV monitor 13 corresponding the front windscreen of the car, a control panel 19 comprising a steering wheel, and a driver's seat, and the like. Other items specific to the game device are also provided, such as a title board 18 and coin slot devices 20. Arranging the plurality of game devices alongside each other in this way is beneficial in communicative game devices where one player is competing against another player.

Figure 5:
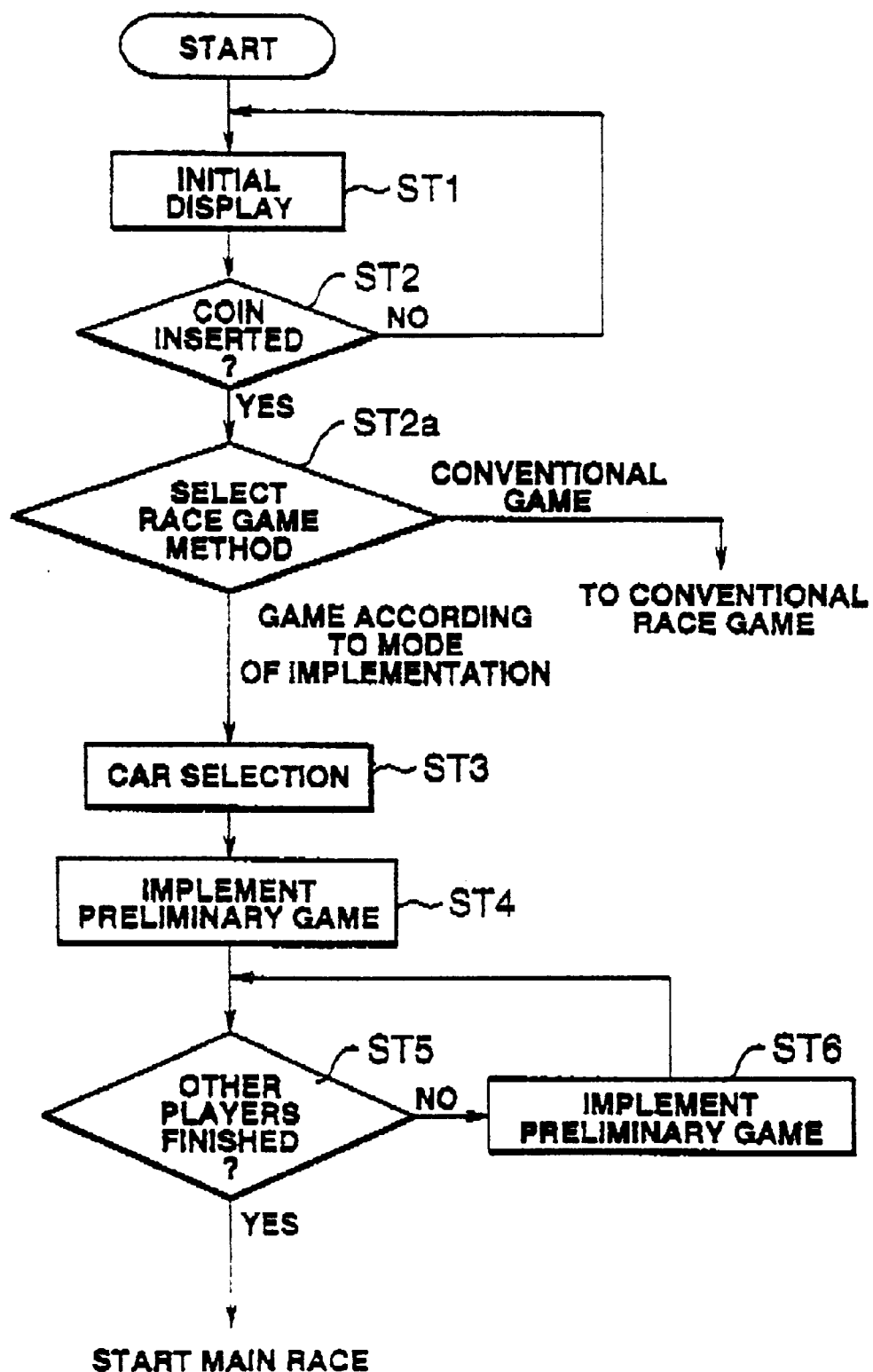
FIG. 5 is a processing flow-chart for a preliminary game in a game device relating to a first mode of implementing this invention.
Figure 6:
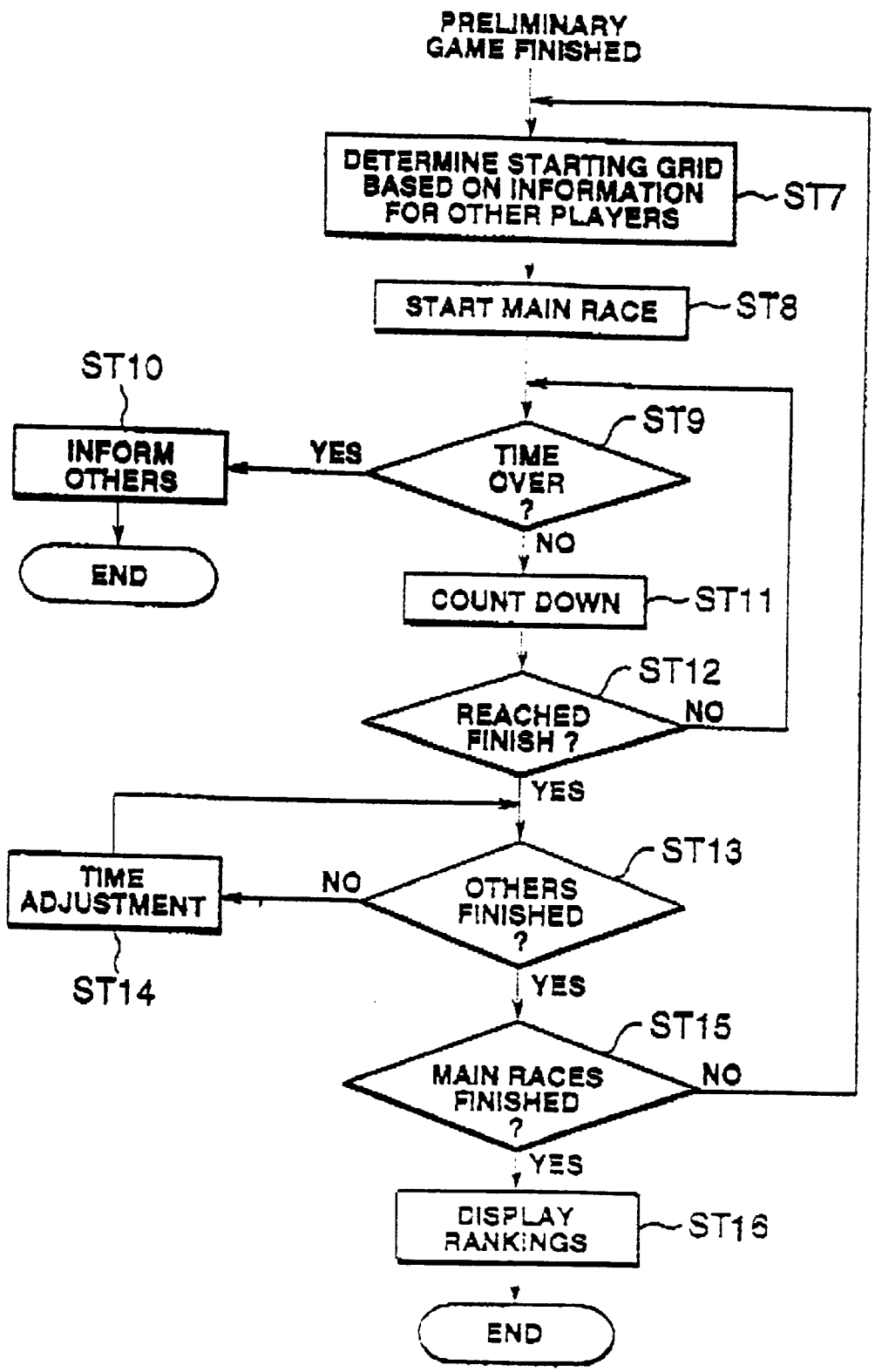
FIG. 6 is a processing flow-chart for a main game in a game device relating to a first mode of implementing this invention.

FIG. 5 is a flow-chart of an operation for a preliminary round in a race game in one of the game devices. FIG. 6 is a similar flow-chart for a main race. The details of these are described later.

Figure 7:
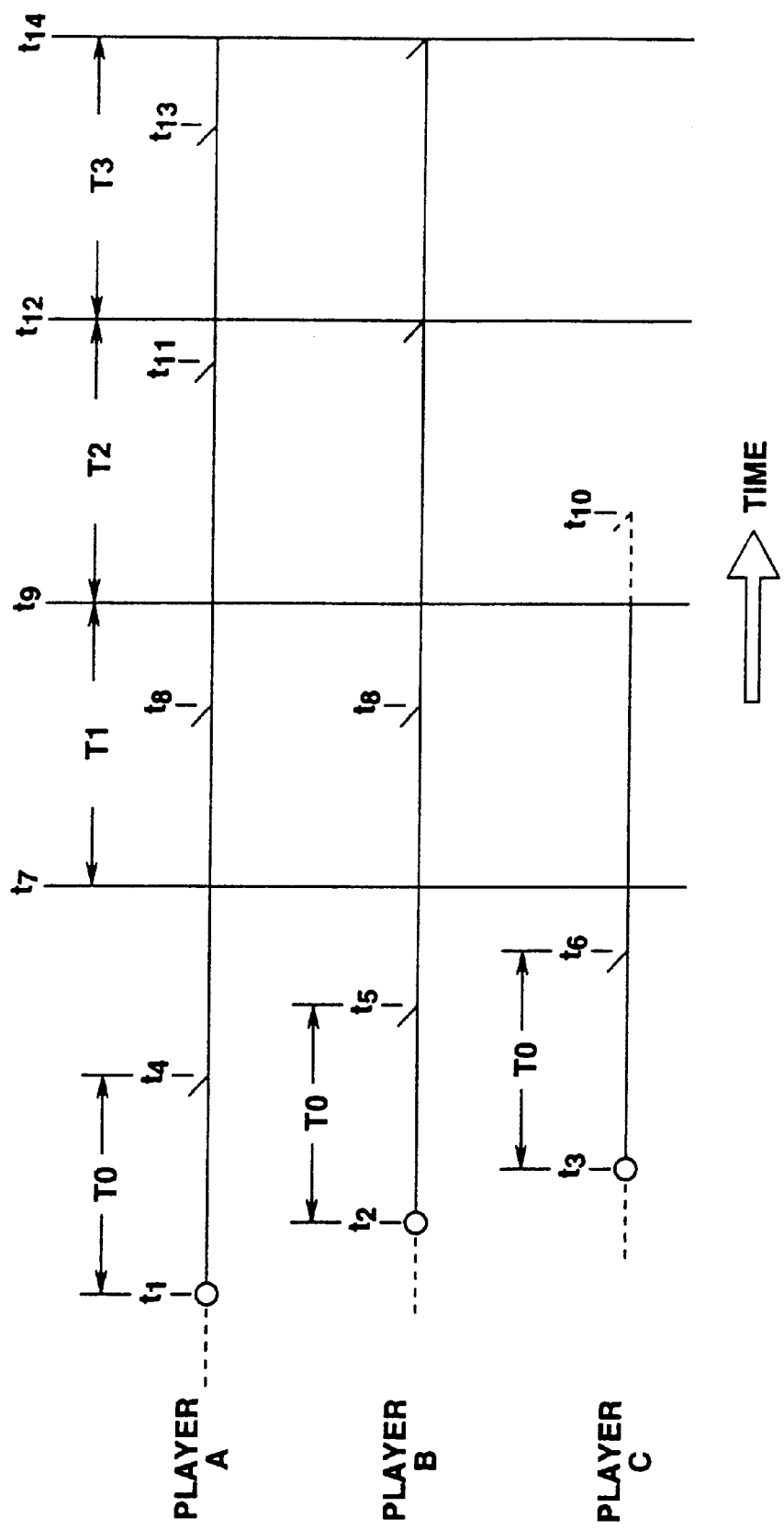
FIG. 7 is a processing timing chart for a game device relating to a first mode of implementing this invention.

FIG. 7 is an operational timing chart for this game device.

In this diagram, three players, A, B and C, are playing a game simultaneously. The time periods T0 are times for the preliminary round, and the time periods T1–T3 are times for the first to third main races, respectively. The symbol t1–t14 indicate time points.

The operation of the device in the first mode for implementing the invention is now described with reference to FIG. 5–FIG. 7.

In some game devices, at the beginning, there is an initial display of a demonstration screen, or the like (ST1).

The device then determines whether or not a coin has been inserted (ST2), and if it has not (NO), the initial display is repeated. If, on the other hand, a coin has been inserted (YES), then the device proceeds to the next step.

As shown in FIG. 5, it is also possible to provide a step ST2a between step ST2 and step ST3, which allows the players to select freely between a conventional game and a game according to this first mode for implementing the invention. A 'conventional game' is one where, if the player at the head of the race passes a check point within a prescribed time period, all the other players can continue to play the game as well. In step S2a, the screen displays a selection of race game methods, for example, "Set end of game for each player individually? [method according to mode for implementing this invention] or Set end of game for all players together? [conventional method]", and the players are asked to select the game method. If the players select the first option, the device proceeds to step ST3. If, on the other hand, they select the second option, then the device proceeds to a step not illustrated in the diagram and the race game is processed in a conventional manner. By providing step ST2a in this way, it is possible to select between a game according to the first mode for implementing the present invention and a conventional game, thus increasing the players' freedom of choice. Furthermore, it also has the merit for game suppliers of allowing them to provide two types of game, a new game and a conventional game, in a single game device.

The players select a desired car from a plurality of cars stored previously in ROMs 102, 111, 113 (ST3). In this device, there is no course selection function, so the only selection is the choice of car. During this, a message such as "Take part in the next race now" is displayed on the TV monitors of the other devices in order to encourage other players to take part.

Next, a preliminary round begins (ST4). In this device, the preliminary round starts straight away, which is different to conventional devices, where the player has to wait until the other players are in place. As illustrated in FIG. 7, the preliminary round starts immediately after player A has put a coin in the slot, at time t1, and it finishes at time t4 after a prescribed period of time. Similarly, player B inserts a coin at time t2 and finishes his or her preliminary round at t5, and player C inserts a coin at time t3 and finishes his or her preliminary round at time t6.

The device then assesses whether the other players have finished their preliminary rounds (ST5). When the preliminary rounds are completed, the CPU 101 in each game device transmits information indicating the end of qualifying and the qualifying time, and the like, to the other game devices via a communications interface 118. This transmitted information is stored in a RAM 103. Therefore, each game device can judge whether or not the preliminary rounds have been completed. If one of the other players has not finished (NO), a time adjustment is made (ST6). In FIG. 7, the waiting time for player A is from time t4 to t7, whilst the waiting time for player B is from time t5 to t7. Player C, who is the last to finish the preliminary round, does not need to wait, but a time interval of several seconds—ten or more seconds should be left for switching screens and allowing the players to prepare themselves.

During this time, it is tedious for the players if they just have to wait, so the monitor displays a replay of their own preliminary round or pit activity, or the like, during this waiting period. In this way, through steps ST5 and ST6, the device waits after the player on that device has finished his or her preliminary round until all the players taking part have finished their preliminary rounds.

Thereby, the preliminary rounds are completed and the device moves on to the main race.

As shown in FIG. 6, a starting grid is determined based on the information relating to the other players (ST7). The starting grid for the first main race is determined on the basis of the qualifying results for all the players, and it reflects each player's skill level. In conventional games, the starting grid is decided compulsorily according to the players' seat positions (whether they are sitting on the left or right or in the middle), or the like, but this detracts from the interest of the game. The starting grids for the second and third main races are determined by the results from the previous race.

The main race then starts (ST8). In the main race, the points score and the end of the game for each player is determined by counting down their game time. The game time for the players is predetermined, but it may be adjusted according to the results of the preliminary rounds. Furthermore, the time count down may be accumulated through the course of the first–third main races, or the time may be counted down for each individual race. In the former case, the game is ended when (Game time)–(1st main race time)–(2nd main race time)–(3rd main race time) reaches zero, whilst in the latter case, the game is ended when any of (Game time)–(1st main race time), (Game time)–(2nd main race time), (Game time)–(3rd main race time) reaches zero. The former case differs from previous communicative games in that the time is set individually for each player, and slower players have to proceed to the next race under tight conditions since they have little time remaining for that race.

The device then determines whether or not the time is over (ST9). If it is over (YES), then this game device transmits a message to this effect to the other game devices (ST10). However, it is not over (NO), the time is counted down (ST11) and the game continues.

The device then judges whether the player has reached the finish (ST12). If the player has not reached the finish (NO), then the device returns to step ST9 and the game continues. If the player has reached the finish (YES), then the device proceeds to step ST13.

The device then determines whether or not the other players have finished (ST13). If there is still a player who has not finished (NO), then a time adjustment is made (ST14). In this case, the monitor may show a replay of the player's own preliminary round or pit activity, or the like, similarly to when the player finishes the preliminary round, or alternatively, it may show the state of rankings, times and the like for the other players, or their display screens. When all of the players has finished the main race (YES), the device proceeds to step ST15.

At step ST15, the device verifies whether or not all the main races have been completed. In the present mode of implementation, there are three main races. If they have not all been completed (NO), the device returns to step ST7 and starts the next main race. If they have been completed (YES), the rankings based on the results of the game are displayed (ST16). With this, the game sequence ends.

Therefore, in this game, the 'game over' conditions follow an orthodox count down system, but as described above, the time is set independently for each player, so slower players have to undertake subsequent races under tight conditions due to the lack of time remaining to them. Accordingly, any player who runs out of time during the game has to retire and their game is finished. In the example in FIG. 7, in the first main race, player C was unable to reach the finish within the specified time period T1 (t10>t9), so his or her game was ended. However, the other players, A and B, were able to continue with the game.

Conversely, when the person in first position reaches the finish with some time still remaining, the other players can still continue the game. In the example in FIG. 7, in the third main race, player B is able to continue the game even after player A has reached the finish.

Rankings are then decided for the people who have cleared the third main race. In the example in FIG. 7, player A's time is shorter than player B's time, so player A takes first position.

In this way, by means of a device according to this mode of implementation, a player can continue to play the game without being affected by the state of the other players. Therefore, the game does not end when the game leader reaches the finish, and the game leader does not have to wait for the other players to finish, thereby avoiding factors which might reduce the appeal of the game.

Next, the operation of a device according to a second mode for implementing the invention is described with reference to FIG. 8 onwards. These drawings serve to describe the calculation of car movements (principally, rotation of the vehicle caused by collisions,) carried out by the CPU 101.

Figure 8:
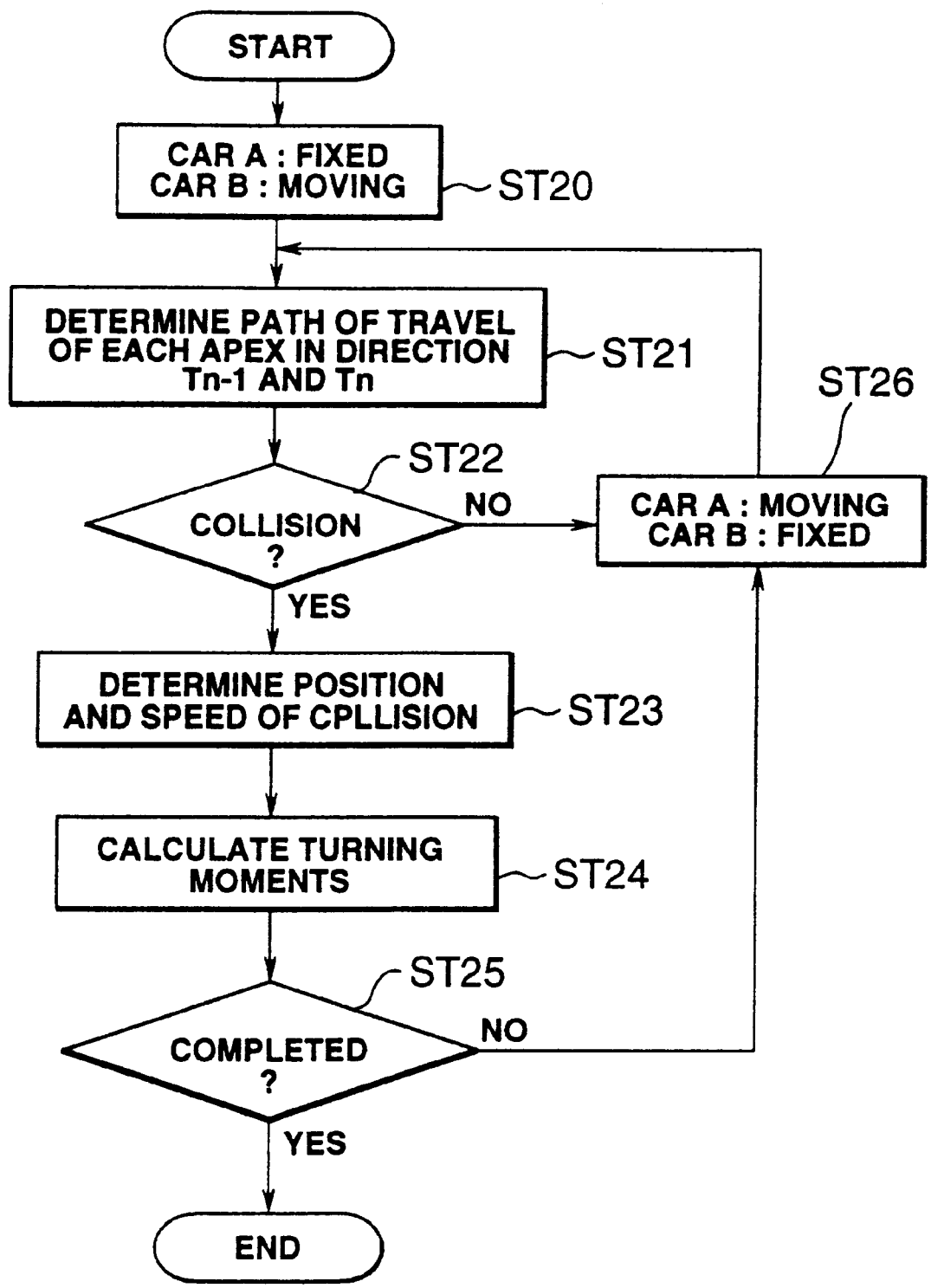
FIG. 8 is a processing flow-chart for a game device relating to a second mode of implementing this invention.

FIG. 8 is a flow-chart for movement processing. It is described in detail later.

Figure 9:
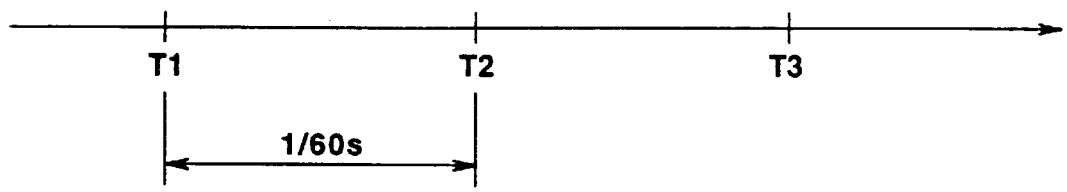
FIG. 9 is a processing timing chart for a game device relating to a second mode of implementing this invention.

FIG. 9 is a diagram illustrating process timing. The processing in FIG. 8 is conducted repeatedly at constant time intervals (in this case, 1/60 sec.) This interval is determined by the refresh rate of the display device, for example.

Figure 10:
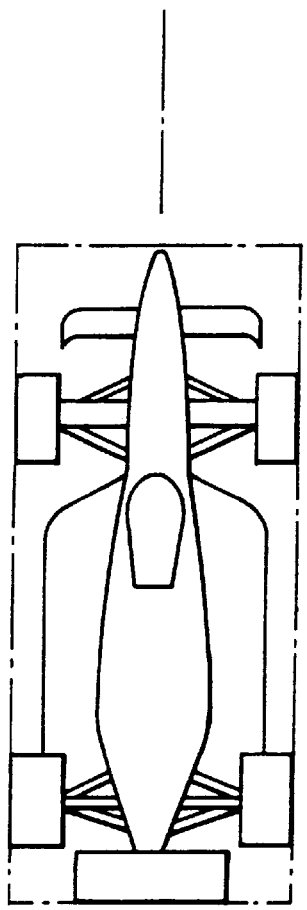
FIG. 10 is an example of an approximate shape of a vehicle for judging collisions relating to a second mode of implementing this invention.

FIG. 10 is a model for processing car movement. This example is based on a Formula racing car. Data relating to the planar shape of the vehicle is previously stored in the shape data ROM 111, for example. Although the vehicle has a complex shape, it is approximated to a rectangle, and processing is based on this approximated shape. The rectangle used for the approximated shape may be selected such that it passes through the largest external dimensions of the vehicle. This shape is suitable for processing collisions between cars. The approximated shape may made slightly smaller, or conversely, slightly larger, than the maximum external dimensions of the vehicle. In the former case, contact becomes more frequent, whilst in the latter case, it becomes less frequent. The approximated shape data may be generated by the CPU 101 from the shape data for the vehicles, or it may be stored in advance in the shape data ROM 111.

Figure 11:
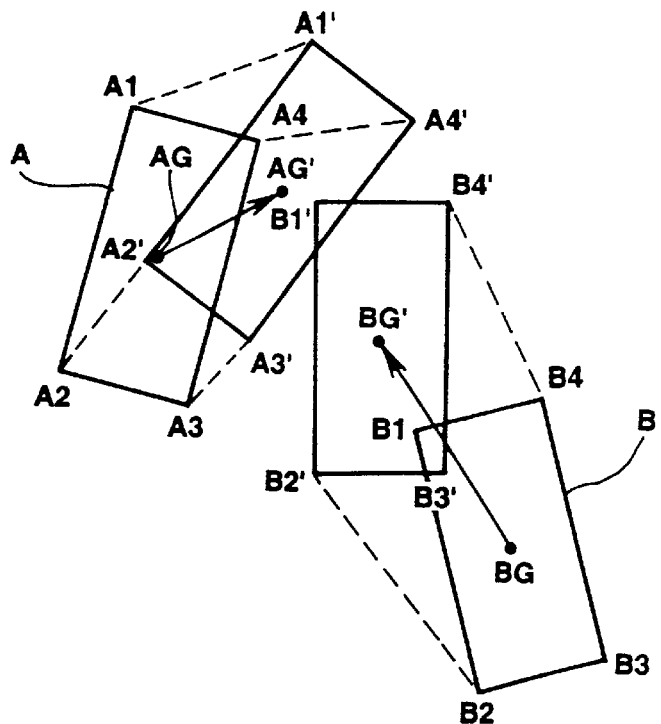
FIG. 11 is a diagram illustrating judgment of a collision relating to a second mode of implementing this invention.

FIG. 11 is a diagram illustrating the movements of two cars. These vehicles are respectively approximated to rectangular shapes. At time T1, for example, car A is located at position A1 A2 A3 A4, and car B is at position B1 B2 B3 B4. A1, . . . and B1, . . . are the apexes of the approximate rectangles. AG and BG are the centers of gravity of the cars A and B. At time T2, car A is at A1' A2' A3' A4', and car B is at B1' B2' B3' B4'. The dotted lines in FIG. 11 show the paths of travel of the apexes.

Figure 12:
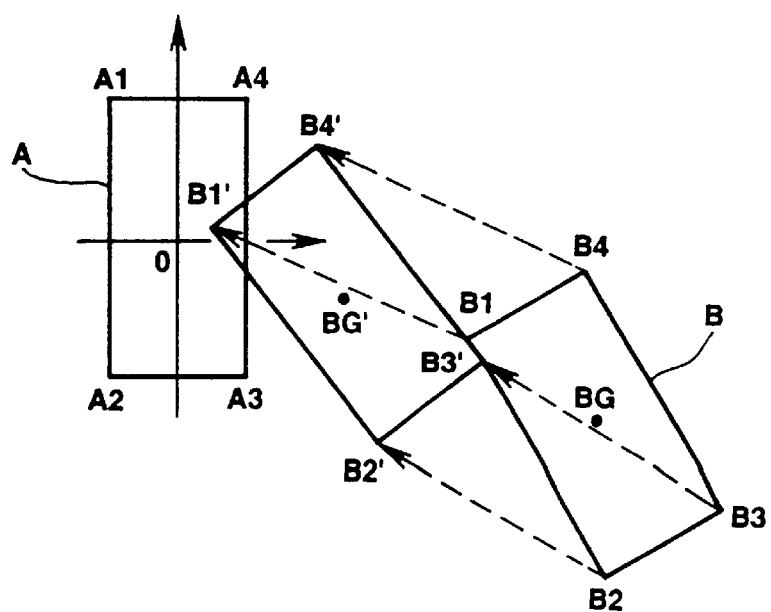
FIG. 12 is a diagram illustrating judgment of a collision relating to a second mode of implementing this invention.

FIG. 12 is a diagram illustrating the relative movement of car B, when car A is taken as being in a fixed position, in order to judge a collision relating to the movement in FIG. 11. Specifically, this defines a perpendicular coordinates system with a point of origin O set at the center of car A, and it represents the movement of car B within this coordinates system.

Figure 13:
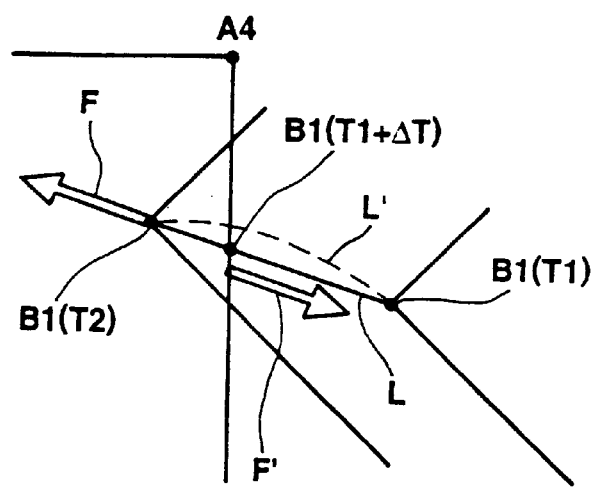
FIG. 13 is a diagram illustrating a method of determining the force of a collision relating to a second mode of implementing this invention.

FIG. 13 is a diagram illustrating a method of finding the position and timing of a collision, and the direction and size of the collision force, as implemented by the device when a collision is adjudged to have occurred.

Figure 14:
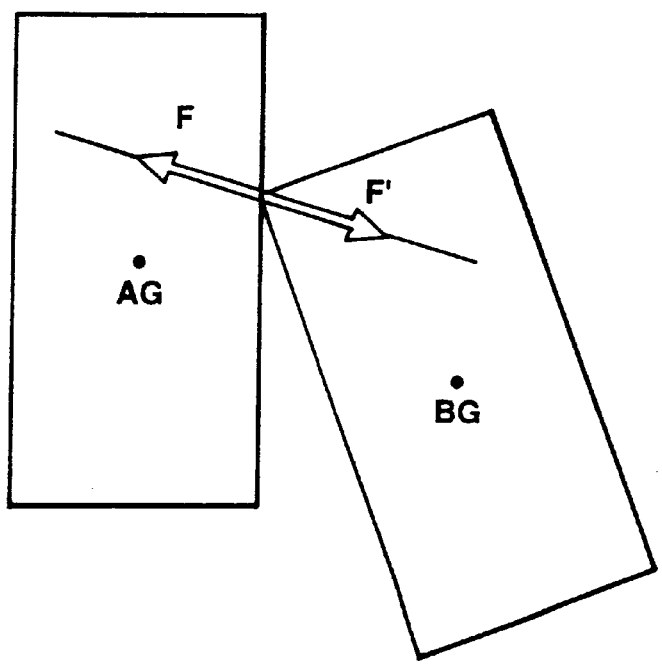
FIG. 14 is a diagram illustrating a method of determining moments in a collision relating to a second mode of implementing this invention.
Figure 15:
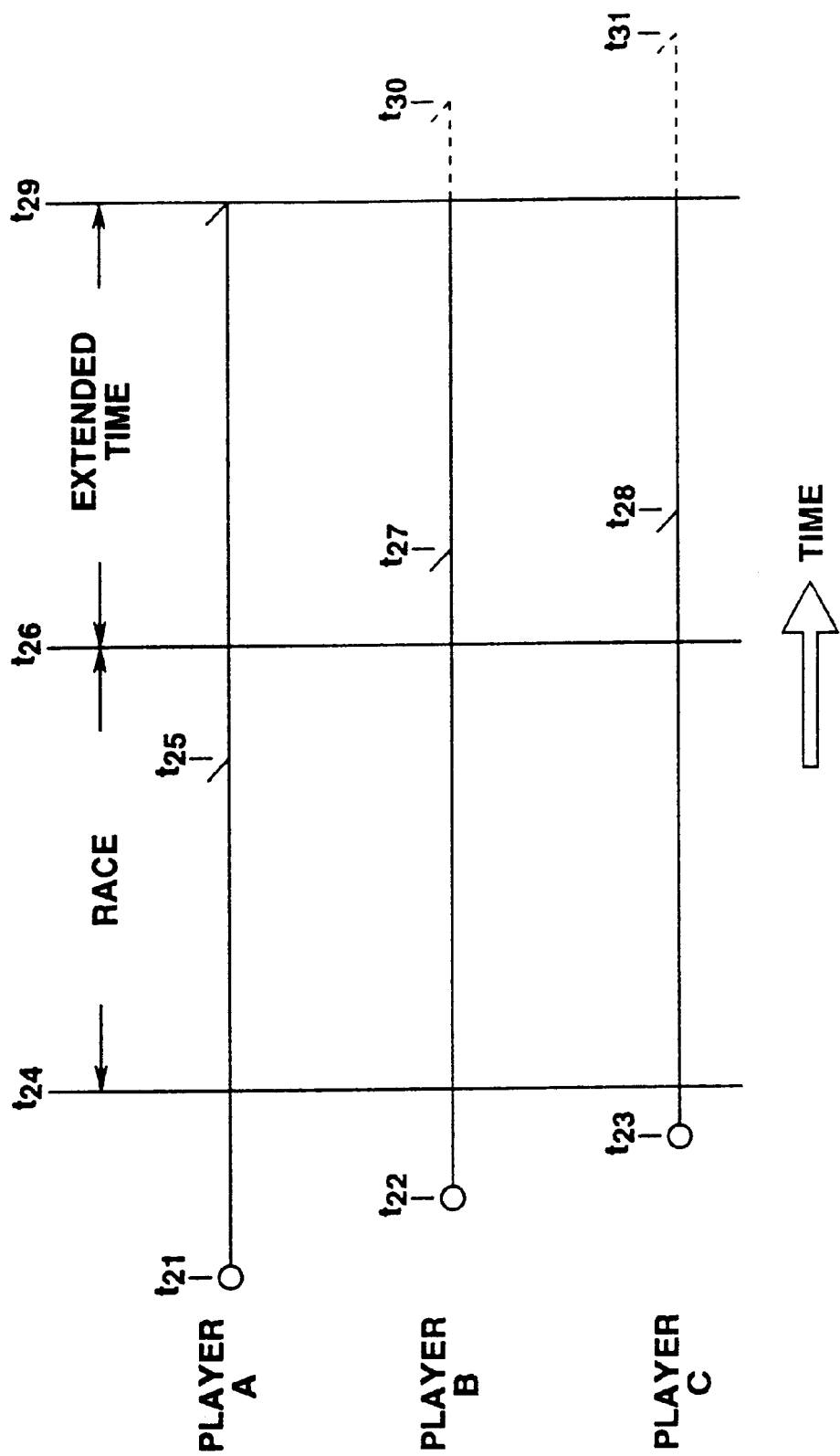
FIG. 15 is a processing timing chart for a conventional game device.

FIG. 14 is a diagram illustrating how moments due to the force produced by a collision are calculated.

The car movement calculations in this second mode for implementing the invention are principally for the purpose of simulating rotational movement caused by a collision between two cars. The following description is based on this example. However, naturally, the invention is not limited to this, and it may also be applied to assessing impacts between cars and the ground, and calculating sliding movements, such as spins, tail slides, and drift, or special movements outside the scope of normal travel, for instance, when the car rolls over or tries to roll over, (in other words, movement in a direction other than the direction selected by the steering wheel or the direction in which the car is pointing). In the second mode for implementing the present invention, this calculation is performed without placing a heavy computing load on the CPU.

Firstly, when the game device is started up, the CPU 101 initiates the processing shown in FIG. 8 by means of timer interrupt processing at fixed intervals of time t. For example, it conducts processing at times T1, T2, T3, . . . in FIG. 9.

When the two cars are moving, as in FIG. 11, for example, calculational processing will be troublesome if the device attempts to conduct processing in this state. Therefore, the processing is simplified by fixing the position of one of the cars (A). Specifically, car A is fixed by defining the coordinates from a position on car A, and car B is moved by being plotted onto this coordinates system (step ST20).

Next, the paths of travel of the apexes between times T1 and T2 are found (ST21). This involves finding the vectors B1B1', B2B2', B3B3', B4B4' indicated by the dotted lines in FIG. 12, for example. When there is relative movement between car A and car B. these paths of travel form curves, when accurately defined. However, since the time intervals involved are relatively short, approximating these paths to straight lines presents virtually no problems in processing.

The next step is that of judging a collision, based on the paths of travel of the apexes (ST22). It is relatively simple to find the impingement relationship with the rectangular shape of car A which is fixed at the origin and does not rotate. In FIG. 12, the apex B1' after movement lies inside car A. When the path of travel crosses the outer perimeter of car A, this indicates that the apex of car B has collided with car B. In other words, it must be judged whether or not any of the apexes B1', B2', B3', B4' of the rectangle at time T2 after movement lie inside the rectangle of car A. Since the rectangle of car A is formed by four straight lines, it is necessary to examine the signs of these equations. If any one lies inside, then a collision is adjudged to have occurred, and the device proceeds to the next step ST23. If this is not the case, then the device proceeds to step ST26, where the coordinates system is reset so that this time, conversely, car B is fixed and car A is moved, and it then returns to step ST21.

If a collision is adjudged to have occurred, the position and speed of the collision are determined from the intersection point and the angle of the path of travel (ST23).

This processing is now described in details based on FIG. 13.

Firstly, the position of the intersection point is found. The position of apex B1 at time T1 is taken as B1(T1), and the position of apex B1 at time T2 is taken as B1(T2). Since the collision occurs at apex B1, B1(T2) lies inside car A and B1(T2) lies outside car A. Therefore, the segment B1(T2) −B1(T1) intersects with at least one edge of the rectangle of car A (this segment L is slightly different from the actual path of travel L', but very little error occurs if it is approximated in this way). Since the equations for each edge of the rectangle of car A are supplied in advance and the coordinates of points B1(T2) and B1(T1) are already known, it is simple to derive an equation for the segment B1(T2)−B1 (T1). Therefore, the intersection point B1(T1+ΔT) (ΔT>0) can be found by solving these simultaneous equations. This intersection point gives the position of impact.

Next, the timing of the collision is determined. As the description above clearly shows, the timing of the collision is (T1+ΔT). Here it is assumed that the relative movement between car A and car B is at a constant speed. Since the time interval in processing is relatively short, at ⅟60th of a second, this assumption does not cause any unnatural effects. In this case, time is converted to line length, and the timing of the collision is derived from the proportional ratios of the segment length.

ΔT: (T2−T1)=(length of B1(T1+ΔT) to B1(T1)): (length of B1(T2) to B1(T1)).

Thereupon, the speed of the collision is derived. The following equation can be given for speed.

(Speed of collision)=(length of B1(T2) to B1(T1)/(T2−T1)=(length of B1(T1+ΔT) to B1(T1)/ΔT Next, the directions of the shock force and associated reaction force in the collision are determined. These directions lie on the line B1(T2)−B1(T1).

Thereupon, the magnitude of the shock force and the reaction force is found. In reality the shock force is complex, but in the game processing it can be simplified and taken as proportional to the speed of collision. It may be taken as proportional to the overall speed of collision, or it may be taken as proportional to the perpendicular component of the speed of collision with respect to the car edge. Furthermore, this proportional coefficient may be fixed, or it may be changed according to conditions. For example, the proportional coefficient may be raised if the angle of impact is steep (for instance, a head-on impact,) and conversely, it may be reduced, if this angle is shallow. Alternatively, the proportional coefficient may be raised if the point of impact is a harder part of the car, such as the car frame, and conversely, it may be reduced if the impact is at a weaker part of the car, such as the car body. In this way, a wide range of variations can be conceived.

From the above, the position and timing of the collision, and the direction and size of the shock force are determined. This is shown pictorially by the forces F, F' in FIG. 13. F is the force acting on car A and F' is the force acting on car B as a reaction to F.

Thereupon, turning moments are calculated (ST25). As shown in FIG. 14, when forces F, F' are applied, the centre of gravity AG of car A and the center of gravity BG of car B are subject respectively to turning moments. The moments are calculated by combining the vectors to the centers of gravity AG, BG from the point of action of forces F and F', with the vectors F, F'.

Next, it is determined whether or not processing has been completed (ST25). When processing has been conducted both with car A in a fixed position and car B in a fixed position, processing is completed.

As described previously, in order to simplify processing, one of the two cars is fixed in position. In this case, it is not possible to judge a collision accurately by processing for only one car, (for example, in the case in FIG. 12, if car B is set in a fixed position, it will be impossible to judge whether a collision has occurred by processing relating the apexes of the rectangle). Therefore, it is necessary to repeat the processing with the other car fixed in position.

If a collision is detected in either case, it is unnecessary to repeat processing beyond that point. Therefore, if a collision is detected at step ST25, the processing may be terminated immediately.

The results of the collision detection and the turning moments based on the collision obtained from the processing described above are stored in the RAM 103, or the like, and are used for processing by the CPU 101, geometrizer 110, drawing device 112, and the like. Thereby, when there is a collision between two cars on the screen, a realistic image is displayed, with the cars rebounding from each other and one or both cars going into a spin, for instance.

Furthermore, according to the method described above, it is possible to obtain results which give a satisfactory approximation by a remarkably simple method compared to detailed simulations.

The foregoing concerned an example where the vehicles are approximated to rectangular shapes, but the invention is not limited to this and shapes of three, four, five or more sides may be formed. In short, any shape may be used provided that it can be represented by straight lines. If the cars are approximated to a circle or an ellipse, whilst impacts can be identified, it is difficult to work out the forces arising from the impact. Therefore, the method according to the second mode for implementing this invention is superior in terms of representing cars spinning, or the like, by deriving the turning moments caused by a collision.

Applying a spin to a car can be conceived simply as applying a turning moment to the car about its center of gravity. Besides this, if the coefficient of friction between the tires and the road surface is taken into account, then if the friction is low, for instance, when the car is traveling on an unmade road or traveling at low speed, it can be made to move in a parallel direction, rather than spinning, and if the friction is high, it can be made to go into a spin more easily. Furthermore, spins can also be generated depending on the direction of the tires when the collision occurs (for example, the car will not be made to spin if the tires are facing in a perpendicular direction to the turning moment). In addition, if the two cars are of different weight, the lighter car can be made to go into a spin, based on the law of preservation of momentum. A variety of methods such as the above can be conceived.

According to this invention, in a processing method for a game, wherein a plurality of players compete, which comprises a preliminary game implementation step for implementing preliminary games, followed by a main game implementation step for implementing main games, since the preliminary game implementation step comprises a preliminary game starting step for implementing a preliminary game in accordance with an operation by any of the players, and a first time adjustment step for displaying a prescribed image after any of the players has finished the preliminary game until the start of the main game, it is possible to start the preliminary game immediately without having to wait for other players. Moreover, since the results of the player's own preliminary game and the results of the other players' preliminary games, for example, are shown during the waiting period before the main game, the players do not become bored.

Furthermore, according to this invention, since the main game implementation step comprises a main game position locating step for determining the start positions of the plurality of players based on the results of the preliminary game implementation step, a monitoring step for monitoring the time status of the players, a notification step for suspending the game for players who have run out of time and indicating this information to other players, and a second time adjustment step for displaying a prescribed image after the main game has finished until the start of the next main game, only skillful players are able to complete the game, thus eliminating any feelings of dissatisfaction in the players. Moreover, since the player's own status in the main game and the status of other players, for example, is displayed during the waiting time until the next main game, the players do not become bored.

Furthermore, according to this invention, in an image processing device which decides the mutual relationships between a plurality of objects composed in a virtual space and generates display images of these objects based on the results of these decisions, since there are provided: positioning means for creating a coordinates system based on any of the plurality of objects and positioning the other objects within this coordinates system; judging means for determining the path of travel of the other objects and making judgments based on the object impingement relationship formed by the paths of travel and the coordinates system; calculating means for calculating the forces acting between objects based on their paths of travel, for objects which are adjudged from the impingement relationship to have made contact or collided; and image generating means for applying movement to the objects based on these calculation results and generating an image of the corresponding situation, it is possible to generate images which reflect the interaction between the objects, for example, cars spinning or drifting, thereby making it possible to provide more realistic images.

Furthermore, according to this invention, since the objects are approximated to polygonal shapes, and furthermore, the paths of travel are taken as the paths of travel of the apexes of these polygonal shapes, and these paths of travel are taken as the respective straight lines linking the positions of the apexes of the polygonal shapes at a first timing with their positions at a second timing, realistic images can be provided by means of simple processing.

The entire disclosure of Japanese Patent Application No. 8-195833 filed on Jul. 25, 1996 and No9-116681 filed on May 7, 1997 including specification, claims, drawings and summary are incorporated herein by reference in its entirety.

What is claimed is:

1. A game processing method, wherein a plurality of players compete, which comprises a preliminary game implementation step for implementing preliminary games, followed by a main game implementation step for implementing main games, said preliminary game implementation step in this game processing method comprising:

a preliminary game starting step for implementing a preliminary game in accordance with an operation by any of the players; and a first time adjustment step for displaying a specific image after any of the players has finished the preliminary game until the start of the main game, said preliminary game being capable of being played by each player individually and independently of the other players, whereby execution of a preliminary game by a player can be accomplished independently of the execution of preliminary games by the other players.

2. A game processing method according to claim 1, wherein said preliminary game implementation step allows a prescribed delay period to the last player to finish the preliminary game, before said main game implementation step is executed.

3. A game processing method according to claim 1, wherein said preliminary game implementation step comprises a display step whereby, when any player is playing the preliminary game, a specific image is displayed on other game devices where no-one is playing the game.

4. A game processing method according to claim 1, said main game implementation step is repeated plural times.

5. A game processing method, wherein a plurality of players compete, which comprises a preliminary game implementation step for implementing preliminary games, followed by a main game implementation step for implementing main games, said main game implementation step in this game processing method comprising:

a main game position locating step for determining the start positions of said plurality of players based on the results of said preliminary game implementation step;

a monitoring step for monitoring the time status of the players;

a notification step for suspending the game for players who have run out of time and sending this information to other players; and a second time adjustment step for displaying a specific image after the main game has finished until the start of the next main game.

6. A game processing method according to claim 4, said main game implementation step comprises a second monitoring step for judging whether or not the leading player has passed through a predetermined check point within a specified time; and a second notification step for suspending the game when said leading player has not passed through said check point within said specified time, and for sending this information to the players;

and prior to said main game implementation step, there is provided a selection step for setting in advance whether said monitoring step and said notification step, or said second monitoring step and said second notification step, are selected.

7. A game processing method according to claim 6, said main game implementation step comprises a rank determining step for determining rankings when the main games are completed, based on the status of other players who have finished the main games.

8. A game processing method according to claim 6, wherein said monitoring step includes the steps of:

accumulating the time respectively required in the plurality of repeated main games; and comparing the time obtained in said accumulation step and the time limit provided to the player playing the game.

9. A game processing method according to claim 5, said main game implementation step comprises a rank determining step for determining rankings when the main games are completed, based on the status of other players who have finished the main games.

10. A game processing method according to claim 5, wherein said monitoring step includes the steps of:

accumulating the time respectively required in the plurality of repeated main games; and comparing the time obtained in said accumulation step and the time limit provided to a player playing the game.

11. A game processing method according to claim 5, said main game implementation step is repeated plural times.

12. A game device structured of an image processing device and a plurality of game units comprising communication units for mutually conducting communication via a communication line, wherein at least one of said game units implements the following steps:

a preliminary game implementation step for implementing a preliminary game; and a main game implementation step for implementing main games;

said preliminary game implementation steps including the steps of:

a preliminary game starting step for implementing a preliminary game in accordance with an operation by any of a plurality of players; and a first time adjustment step for displaying a specific image after any of the players has finished the preliminary game until the start of the main game, a main game position locating step for determining the start positions of said plurality of players based on the results of said preliminary game implementation step.

13. A game device structured of an image processing device and a plurality of game units comprising communication units for mutually conducting communication via a communication line, wherein at least one of said game units implements the following steps:

a preliminary game implementation step for implementing preliminary games; and a main game implementation step for implementing main games in succession to said preliminary game implementation step;

wherein said main game implementation step includes the steps of:

a main game position locating step for determining the start positions of said plurality of plays based on the results of said preliminary game implementation step;

a monitoring step for monitoring the time status of the players;

a notification step for suspending the game for players who have run out of time and indicating this information to other players; and a second time adjustment step for displaying a specific image after any of the players has finished the preliminary game until the start of the main game.

14. A game device comprising:

a plurality of game units comprising an image processing device for generating game images and communication units for mutually conducting communication via a communication line, and a control unit for controlling this plurality of game units;

wherein said control unit implements the following steps:

a preliminary game implementation step for implementing a preliminary game; and a main game implementation step for implementing main games in succession to said preliminary game implementation step;

said preliminary game implementation steps including the steps of:

a preliminary game starting step for implementing a preliminary game in accordance with an operation by any of a plurality of players;

a first time adjustment step for displaying a specific image after any of the players has finished the preliminary game until the start of the main game, a main game position locating step for determining the start positions of said plurality of players based on the results of said preliminary game implementation step.

15. A game device comprising:

a plurality of game units comprising an image processing device for generating game images and communication units for mutually conducting communication via a communication line; and a control unit for controlling this plurality of game units;

wherein said control unit implements the following steps:

a preliminary game implementation step for implementing a preliminary game; and a main game implementation step for implementing main games in succession to said preliminary game implementation step;

wherein said main game implementation step includes the steps of:

a main game position locating step for determining the start positions of said plurality of players based on the results of said preliminary game implementation step;

a monitoring step for monitoring the time status of the players;

a notification step for suspending the game for players who have run out of time and indicating this information to other players; and a second time adjustment step for displaying a specific image after any of the players has finished the preliminary game until the start of the main game.

16. A recording medium whereon programs for implementing the following steps in a processing device are stored:

a preliminary game implementation step comprising a preliminary game starting step for implementing a preliminary game in accordance with an operation by any of the players, and a first time adjustment step for displaying a specific image after any of the players has finished the preliminary game until the start of the main game; and following this, a main game implementation step for implementing main games, said preliminary game being capable of being played by each player individually and independently of the other players, whereby execution of a preliminary game by a player can be accomplished independently of the execution of preliminary games by the other players.

17. A recording medium whereon programs for implementing the following steps in a processing device are stored:

a preliminary game implementation step for implementing preliminary games; and a main game implementation step comprising: a main game position locating step for determining the start positions of said plurality of players based on the results of said preliminary game implementation step; a monitoring step for monitoring the time status of the players; a notification step for suspending the game for players who have run out of time and sending this information to other players; and a second time adjustment step for displaying a specific image after the main game has finished until the start of the next main game; which implements main games following said preliminary game implementation steps.

* * * * *